No. 632,989.  
G. O. DRAPER.  
SPINDLE AND BEARING.  
(Application filed Jan. 28, 1899.)
Patented Sept. 12, 1899.
(No Model.)
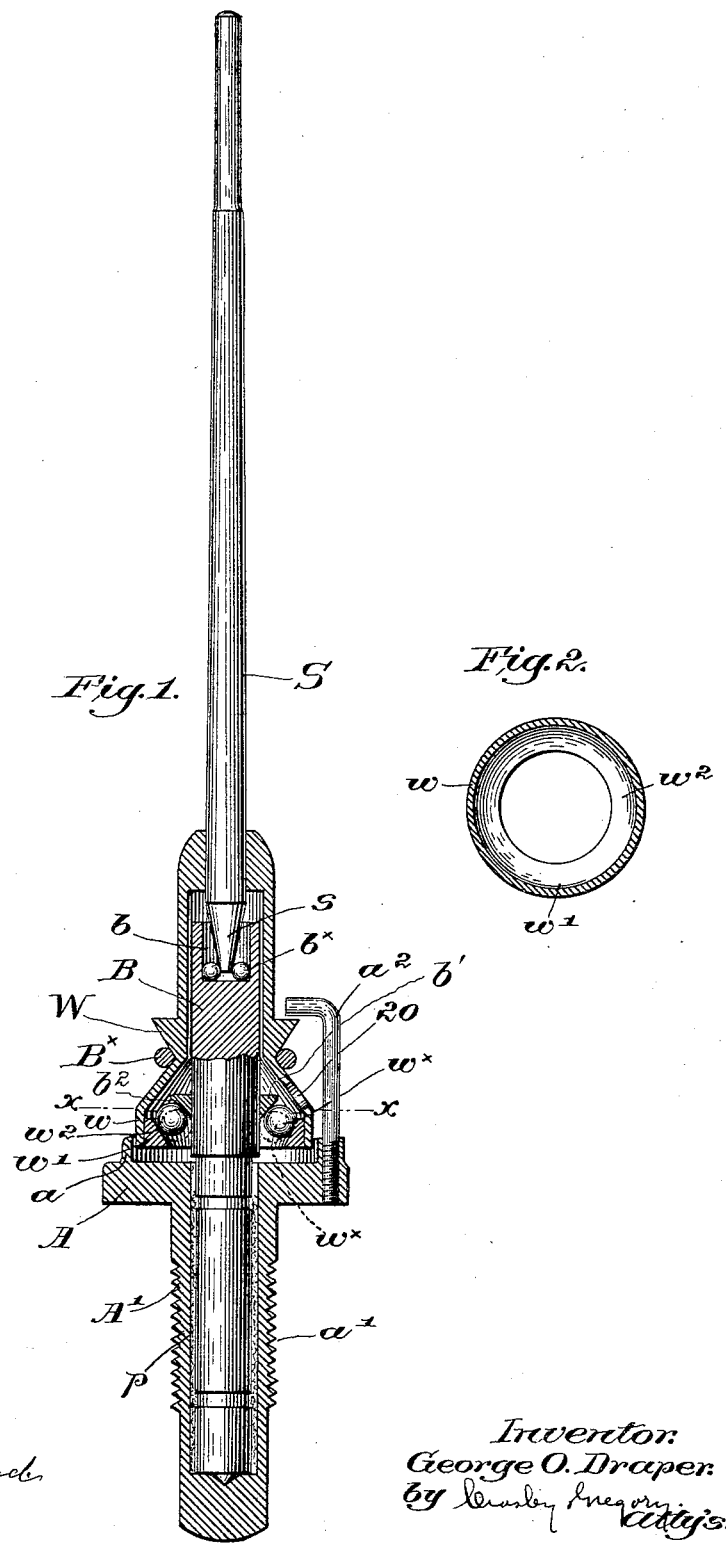
Witnesses.  
Thomas J. Drummond  
James M. Urquhart
Inventor:  
George O. Draper.  
by Crosby Gregory  
Att'ys.
THE NORRIS PETERS CO., PHOTO-LITHO., WASHINGTON, D. C.

UNITED STATES PATENT OFFICE.

GEORGE O. DRAPER, OF HOPEDALE, MASSACHUSETTS, ASSIGNOR TO THE DRAPER COMPANY, OF SAME PLACE AND PORTLAND, MAINE.

SPINDLE AND BEARING.

SPECIFICATION forming part of Letters Patent No. 632,989, dated September 12, 1899.

Application filed January 28, 1899. Serial No. 703,668. (No model.)

*To all whom it may concern:*

Be it known that I, GEORGE O. DRAPER, of Hopedale, county of Worcester, State of Massachusetts, have invented an Improvement in Spindles and Bearings, of which the following description, in connection with the accompanying drawings, is a specification, like letters and figures on the drawings representing like parts.

This invention relates to spindles and their supporting-bearings for use in spinning-machines and the like; and it has for its object the production of a novel construction and arrangement of parts whereby any lateral vibration or error in the proper rotation of the spindle is controlled or counteracted by centrifugal force acting through the intermediary of what is practically a yielding rolling bearing. By the construction referred to the vibration of the spindle when running at high speed is reduced to a minimum and the spindle rotates with greatly-decreased friction.

Figure 1 is a vertical sectional view of a spindle and bearing embodying one form of my invention, the spindle itself and a portion of the removable bolster being shown in elevation; and Fig. 2 is a transverse sectional view on the line $x\ x$, Fig. 1, of the rotating raceway or ball-supporting member of the rolling lateral bearing.

The spindle-support comprises a base A, Fig. 1, having a hollow depending shank $A'$ to extend through a hole in the usual spindle-rail and exteriorly threaded at $a'$ to receive a retaining-nut (not shown) to hold the support firmly on the rail. A bolster B loosely enters the shank and projects above it for some distance, the upper end of the bolster being herein shown as recessed or bored at $b$ to form a seat for a series of antifriction-balls $b^\times$, which serve as a step or end-thrust bearing for the tapering lower end $s$ of the spindle S. The annular space between the lower end of the bolster and the interior of the support-shank $A'$ is preferably filled with suitable packing $p$. A depending sleeve $c$, rigidly secured to the spindle above the upper end of the bolster, extends downward outside of the latter and has formed upon or secured to its lower end a whirl W for the driving-band $B^\times$. The bottom of the whirl is herein shown as extended to form a cylindrical flange $w$, in which is secured a preferably hardened-steel ring $w'$, having its inner face $w^2$ upwardly flared to form a rotating raceway or traveling member of the lateral rolling bearing for the spindle. A collar $b'$ is forced onto or otherwise secured to the bolster above the ring $w'$, the lower face $b^2$ of said collar also flaring upwardly and opposed to the ring-face $w^2$, said faces slightly converging, however, toward their peripheries, said collar forming the fixed member of the lateral bearing. Between the faces $b^2$ and $w^2$ a series of rolling members $w^\times$ are interposed, preferably hardened-steel balls, the rotation of the ring $w^2$ with the spindle causing the balls to roll upon the fixed member $b^2$ of the bearing. When the spindle is running, the rotation of the raceway acts by or through centrifugal force to cause the balls to fly outward and up along the inclined face $w^2$ of the raceway, the balls being held in place, however, by the convergence of the faces $w^2 b^2$. I thus obtain a very sensitive bearing for the spindle, which counteracts any lateral vibration or error in the rotation of the spindle, a practically yielding rolling bearing being thus provided, the yielding feature thereof being furnished and controlled by centrifugal force.

In Fig. 1 the dotted lines indicate the position of the balls $w^\times$ when the spindle is at rest, the balls impinging against the bolster and the raceway, whereas the full lines indicate the position of the balls when the spindle is running, the centrifugal force constantly urging them outward and up the inclined face $w^2$.

The width of the annular space between the lower inner edge of the raceway and the bolster B is less than the diameter of the balls, as is the distance between the peripheries of the fixed and movable members $b'\ w'$, so that the balls are held from displacement.

One or more holes, as 20, may be made in the lower part of the whirl for the insertion of the balls $w^\times$ when the parts are being assembled, an upturned guard-lip or flange $a$ on the spindle-support A extending around the depending whirl-flange $w$ and preventing any improper lateral movement of the whirl.

A detent (shown as a piece of stout wire $a^2$) is mounted in the support A to extend over the top of the sleeve-whirl W and prevent it from accidental lifting.

It will be seen that the end-thrust or step bearing for the spindle and about which it may tip slightly is located some distance above the supplementary or lateral bearing, the former bearing sustaining the weight of the spindle and sleeve-whirl.

My invention is not restricted to the precise construction and arrangement herein shown, for so far as I am aware it is broadly new to counteract or prevent lateral spindle vibration by or through the action of centrifugal force.

Having described my invention, what I claim as new, and desire to secure by Letters Patent, is—

1. A vertically-rotating spindle, coöperating fixed and rotatable bearing members arranged one above the other concentric with the spindle and having opposed outwardly-converging conical faces, the rotatable member being attached to the spindle, and a series of balls interposed between said faces and controlled as to their position by centrifugal force, the said balls contacting loosely with the said opposed faces when the spindle is at rest.

2. A vertically-rotating spindle, an attached shell having an internal upwardly-flaring ball-raceway, a fixed conical bearing opposed thereto above it and converging outwardly thereto, and a series of antifriction-balls interposed between said bearing and raceway and positioned by centrifugal force, to govern lateral vibration of the spindle, the balls loosely contacting with said bearing and raceway when the spindle is at rest.

3. A spindle-support, a spindle, a bearing in said support to sustain the spindle vertically, and an independent yielding rolling bearing for the spindle comprising opposed outwardly-converging faces and a series of balls between them, to govern lateral vibration thereof, said rolling bearing being located below the vertical bearing, the said faces contacting loosely with the balls when the spindle is at rest.

4. A spindle-support, a spindle, a bearing in said support to sustain the spindle vertically, superposed upwardly-flaring annular members carried by said support and the spindle respectively and converging outwardly, and a series of antifriction-balls interposed between said members, controlled as to their radial movement by centrifugal force, to counteract lateral vibration of the spindle, loosely contacting with the said flaring members when the spindle is at rest.

5. A vertically-rotating spindle having a tapered lower end, an end-thrust ball-bearing therefor, comprising a series of balls arranged circularly around the spindle end and vertically supporting it, and means to control lateral vibration of the spindle by centrifugal force.

6. A spindle-support, a vertically-rotating spindle having a step-bearing on said support, and a lateral ball-bearing located below the step-bearing and including means to control the position of the balls by or through centifugal force.

7. A spindle-support, a vertically-rotating spindle mounted thereupon, a sleeve-whirl attached to the spindle, a ball-raceway having an upwardly-flaring face carried by the whirl, a fixed bearing member, and a series of balls interposed between said fixed member and the traveling raceway, the faces of said member and the raceway outwardly converging and loosely contacting with the balls when the spindle is at rest.

In testimony whereof I have signed my name to this specification in the presence of two subscribing witnesses.

GEORGE O. DRAPER.

Witnesses:
 E. D. BANCROFT,
 A. H. COUSINS.